United States Patent [19]

Kimura

[11] Patent Number: 4,947,162

[45] Date of Patent: Aug. 7, 1990

[54] TERMINAL DEVICE FOR A MONITORING AND CONTROL SYSTEM

[75] Inventor: Tetsuo Kimura, Tokyo, Japan

[73] Assignee: Nittan Company, Ltd., Tokyo, Japan

[21] Appl. No.: 309,302

[22] Filed: Feb. 13, 1989

[30] Foreign Application Priority Data

Feb. 17, 1988 [JP] Japan .................................. 63-32906

[51] Int. Cl.$^5$ ............................................. G08B 17/00
[52] U.S. Cl. ......................... 340/825.080; 300/825.07;
300/506; 300/825.52; 300/539; 370/95.2
[58] Field of Search ...................... 240/825.06, 825.07,
240/825.08, 825.1, 825.12, 825.13, 825.52,
825.51, 825.5, 505, 506, 518, 539, 533; 370/90,
96, 112, 85.8, 95.2; 178/2 C

[56] References Cited

U.S. PATENT DOCUMENTS

| | | | |
|---|---|---|---|
| 3,787,627 | 1/1974 | Abramson et al. | 370/85.8 |
| 4,228,424 | 10/1980 | Le Nay et al. | 340/506 |
| 4,477,799 | 10/1984 | Rocci et al. | 340/505 |
| 4,581,606 | 4/1986 | Mallory | 340/518 |
| 4,652,860 | 3/1987 | Weishaupt et al. | 340/539 |
| 4,658,243 | 4/1987 | Kimura et al. | |

FOREIGN PATENT DOCUMENTS

| | | |
|---|---|---|
| 0074865 | 3/1983 | European Pat. Off. . |
| 0180990 | 5/1986 | European Pat. Off. . |
| 60-82389 | 6/1985 | Japan . |
| 61-126393 | 8/1986 | Japan . |
| 62-86936 | 4/1987 | Japan . |
| 2131990 | 6/1984 | United Kingdom ................ 340/539 |

Primary Examiner—Donald J. Yusko
Assistant Examiner—Eric Oliver Pudpud
Attorney, Agent, or Firm—Hill, Van Santen, Steadman & Simpson

[57] ABSTRACT

In a terminal device adapted to effect transmission and receipt of information through address polling by a central monitoring/control device, an address having a predetermined number of bits is preset in a first address setter, and an address comparator compares the address of a predetermined number of bits set in the first address setter with address data sent from the central monitoring/control device. As the result of this comparison, when the address of the predetermined number of bits set in the first address setter coincides with an address sent from the central monitoring/control device, the central monitoring/control device sends a new address, and this new address is set in a second address setter with respect to the terminal device whose address has coincided. Thus, after the new address is set in the second address setter of each of the terminal devices, the terminal devices are polled by the central monitoring-/control device on the basis of these new addresses.

7 Claims, 3 Drawing Sheets

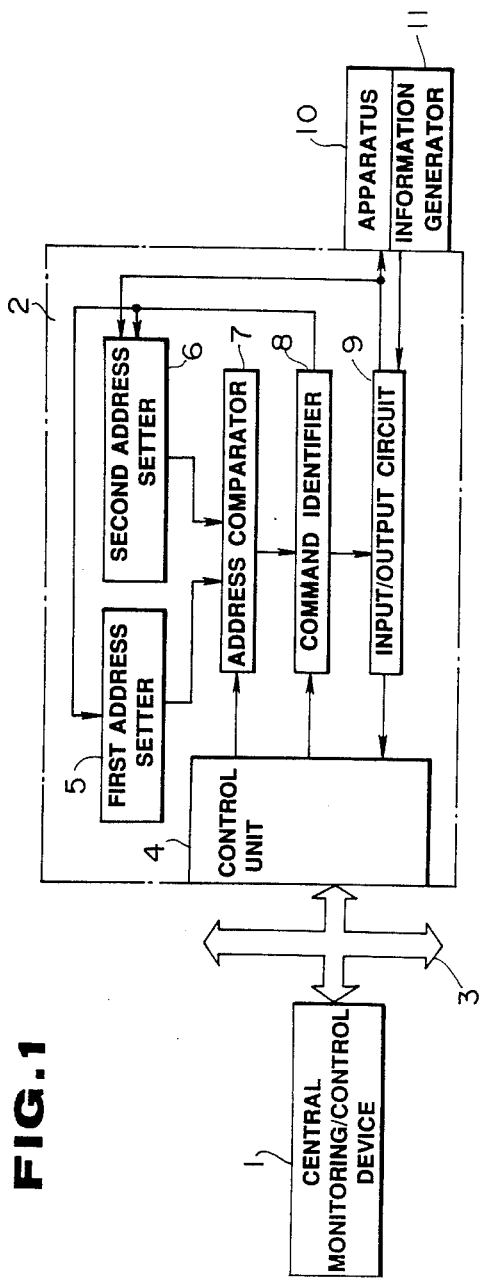
FIG.1
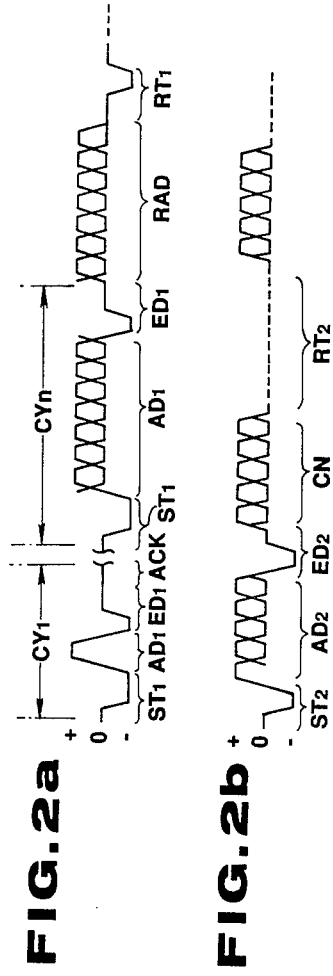
FIG.2a
FIG.2b

TERMINAL DEVICE FOR A MONITORING AND CONTROL SYSTEM

BACKGROUND OF THE INVENTION

The present invention relates to a terminal device adapted to effect transmission and receipt of information through address polling from a central monitoring and control device.

In a monitoring and control system, such as a security system or a burglar system, centralized monitoring and control is generally effected by a central monitoring and control device with respect to various apparatuses to be controlled and/or various sensors such as temperature sensors, smoke density sensors, and burglar sensors that are arranged in various locations within a building. Various terminal devices are provided in correspondence with the various apparatuses and/or sensors, and the central monitoring and control device is adapted to control the various sensors and apparatuses via the terminal devices corresponding to the respective sensors and/or apparatuses.

In such a monitoring and control system, addresses for specifying terminal devices that communicate with the central monitoring and control device need to be provided in the respective terminal devices themselves. For this reason, each conventional terminal device is provided with a manual switch, such as a multiple switch or a rotary digital code switch, or a semiconductor memory such as a EPROM that has a predetermined number of bits. Addresses peculiar to individual terminal devices are thereby set at the time of manufacture of the terminal devices or when the terminal devices are installed at the installation sites.

With such conventional terminal devices, it is possible to freely set the addresses at the discretion of the operator. However, there is a possibility that the same addresses may be set to a plurality of terminal devices, which can cause abnormalities in transmission. Therefore, when a system includes a multiplicity of terminal devices, it has been necessary to set addresses for the respective terminal devices with the utmost care, so that this setting operation has been time-consuming and has involved much labor.

Where addresses are set in a plurality of terminal devices using the same number of bits (e.g., 20 bits) large enough to overcome the above-described problem and to lower the probability of the addresses of the terminal, devices being duplicated, if the central monitoring and control device polls the terminal devices on the basis of the addresses each having that number of bits, there has been a drawback in that the time duration of transmission with a certain terminal device becomes unnecessarily long, resulting in a decline in transmission efficiency.

To cope with this problem, Japanese Pat. Laid-Open No. 86936/1987 discloses a system in which a plurality of secondary stations are serially connected to each other, and the addresses of the plurality of secondary stations are set automatically in the sequence in which they are connected serially in correspondence with counts of a primary station-side counter. In such a system, it is possible to substantially reduce the time and labor required in setting the addresses of the secondary stations which correspond to the aforementioned terminal devices. In addition, it is possible to prevent errors in a setting process thereof and to prevent a decline in the transmission efficiency.

On the other hand, there are cases where it is desirable for the operator to freely set the addresses at his discretion in such a manner that the probability of the addresses being duplicated is reduced and the efficiency of transmission between the central monitoring and control device and the terminal devices is improved. With the above-described system, however, the addresses are set uniformly in the order of serial connection, and no consideration has been paid to the fact that it is desirable that addresses be set freely irrespective of the state of connection of the terminal devices at the discretion of the operator or the like.

SUMMARY OF THE INVENTION:

Accordingly, an object of the present invention is to provide a terminal device for use in a monitoring/control system which is capable of freely setting the addresses of terminal devices at the discretion of the operator, of reducing the probability of the addresses being duplicated, and of remarkably improving the efficiency of transmission between a central monitoring and control device and the terminal devices, thereby overcoming the above-described drawbacks of the conventional art.

To this end, in accordance with the present invention, there is provided a terminal device adapted to effect transmission and receipt of information through address polling from a central monitoring and control device, comprising: first address setting means in which an address having a predetermined number of bits is preset; comparing means for comparing address data sent from the central monitoring and control device with the address having the predetermined number of bits and set in the first address setting means; second address setting means in which, when the address data sent from the central monitoring and control device coincides with the address set in the first address setting means, a new address having a fewer number of bits than that of the address set in the first address setting means, is sent from the central monitoring and control device and is set, wherein after the new address is set in the second address. setting means, the central monitoring and control device effects polling on the basis of the new address.

The above and other objects, features and advantages of the present invention will become more apparent from the following detailed description of the invention when read in conjunction with the accompanying drawings.

BRIEF DESCRIPTION OF THE DRAWINGS

FIG. 1 is a block diagram of a monitoring and control system to which a terminal device in accordance with the present invention is applied;

FIGS. 2a and 2b are time charts illustrating an example of the operation of the terminal device shown in FIG. 1.

DESCRIPTION OF THE PREFERRED EMBODIMENTS

Figure 3A:
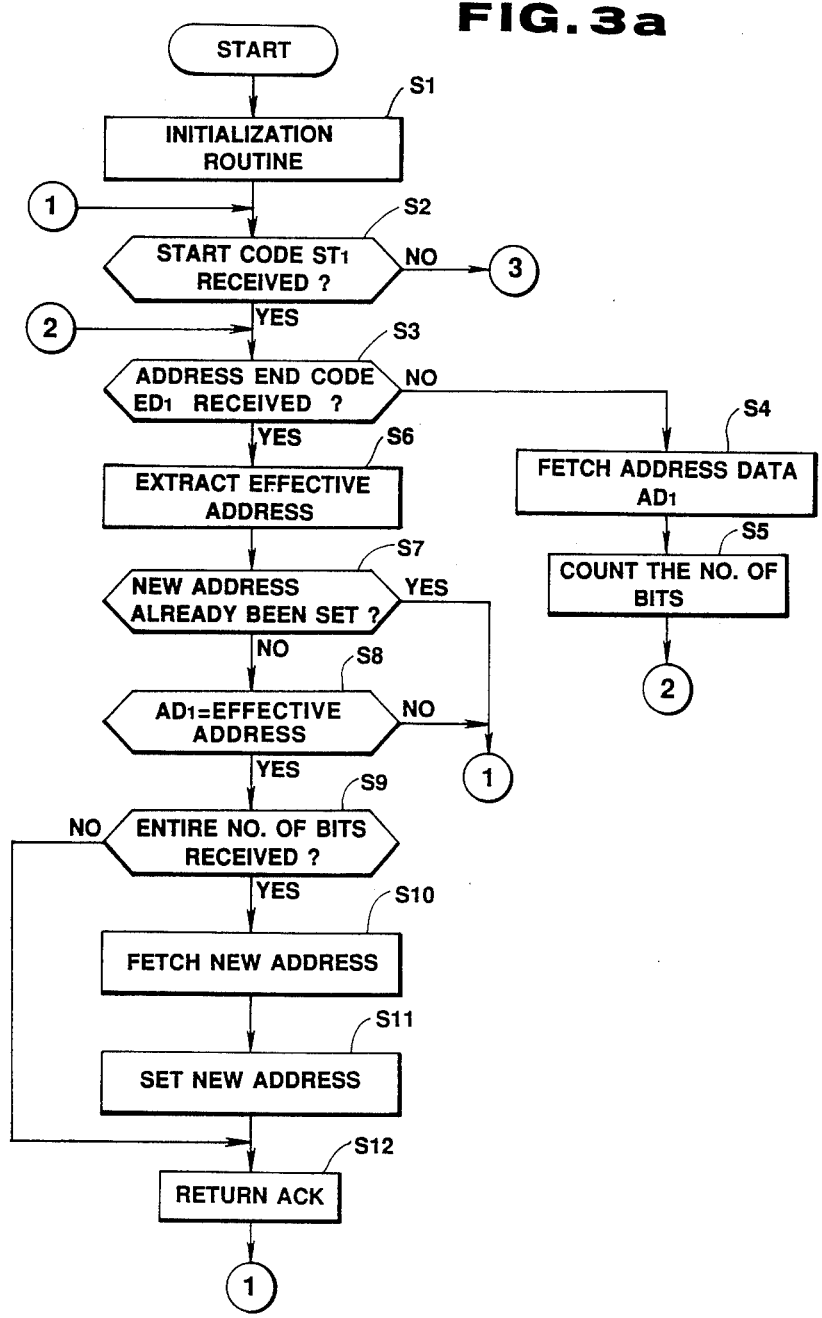
FIGS. 3a and 3b are flowcharts illustrating the flow of processing where a microcomputer is used for the terminal device.

Referring now to the accompanying drawings, a description will be given of the preferred embodiments of the present invention.

In FIG. 1, at least one terminal device 2 is connected to a central monitoring and control device 1 via a common transmission line 3. An apparatus 10 is adapted to be controlled by the central monitoring and control device 1, and an information generator 11, such as a temperature sensor, a smoke density sensor, a burglar sensor, or a similar sensor, is adapted to generate information to be supplied to the central monitoring and control device 1. Each of the terminals 2 is provided in correspondence with each of the apparatuses 10 and/or the information generators 11, and is adapted to function as an input/output controller for each of the apparatuses 10 and/or the information generators 11 when the central monitoring and control device 1 monitors and controls the apparatuses 10 and the information generators 11. In addition, the terminal devices 2 are generally installed at different locations in correspondence with the locations where the apparatuses 10 and/or the information generators 11 are installed. In FIG. 1, only one terminal device 2 is illustrated for the sake of simplicity.

Each of the terminal devices 2 comprises the following components: a control unit 4 which functions as an interface with the central monitoring and control device 1 and controls the overall terminal device 2; a first address setter 5 in which a peculiar address for specifying the terminal device 2 has been preset at the discretion of the operator or the like; a second address setter 6 in which, a new address sent from the central monitoring and control device 1 is to be set; an address comparator 7 which is adapted to compare address data from the central monitoring and control device 1 with the address set in the first address setter 5 at least at the time when the new address is set in the second address setter 6 or which is adapted to compare, an address sent from the central monitoring and control device 1 so as to monitor and control a given apparatus 10 and/or information generator 11 with the new address set in the second address setter 6; a command identifier 8 for identifying a command sent from the central monitoring and control device 1; an input/output circuit 9 for effecting input/output processing for sending a control signal from the central monitoring and control device 1 to the apparatus 10 and/or for inputting a signal from the information generator 11 to the central monitoring and control device 1, in response to a signal from the command identifier 8.

The date of manufacture or the manufacturing No. of the terminal device, for example, is set in the first address setter 5 as a peculiar address at the discretion of the operator. At that juncture, the peculiar address has the number of bits, e.g., 20 bits, necessary to sufficiently lower the probability of the addresses allotted to the terminal devices 2 being duplicated. If the number of bits is 20 bits, it is possible to freely allot different addresses to slightly less than 1,050,000 terminal devices.

Meanwhile, the number of bits of the new address set in the second address setter 6 approximately corresponds to the aggregate number of the terminal devices 2 used. For example, if the number of terminal devices 2 that are actually used is between 16 to 1,024 or thereabouts, 4 to 10 bits or thereabouts are sufficient for the new address to be set in the second address setter 6.

The command identifier 8 is adapted to identify a command such as a new address-setting command sent from the central monitoring and control device 1 or a command for monitoring and controlling a given apparatus 10 and/or information generator 11 on the basis of the new address. For instance, if the command identifier 8 determines that the command is for setting a new address, the first and second address setters 5, 6 commence processing for automatically setting a, say, 20bit redundant address initially set by the first address setter 5 to the new address having a small number of bits, such as 4 to 10 bits or thereabouts, as in the above-described example. Meanwhile, if the command identifier 8 determines that the command is for monitoring and controlling a given apparatus 10 and/or information generator 11 on the basis of the new address, the second address setter 6 is started.

A description will now be given of the procedure of effecting processing for setting a new address in the terminal device 2 having the above-described arrangement. The processing for new address-setting is carried out as the address preset in the first address setter 5 of each of the terminal devices 2 is first accessed by the central monitoring and control device 1. If the number of bits of this address is 20 bits as in the case of the above-described example, the aggregate number of addresses is slightly less than 1,050,000, and if the first to the 1,050,000th addresses are accessed, it takes approximately six hours to access all the addresses if it is assumed that it takes 20 msec to access one address, so that it does not serve practical purposes.

For this reason, in this embodiment, address polling is effected sequentially in the form of a dialogue between the central monitoring and control device 1 and each of the terminal devices 2, as shown in FIG. 2a. In other words, if the number of bits of the address preset in the first address setter 5 is assumed to be n, the central monitoring and control device 1 inputs a start code $ST_1$, an address data $AD_1$, an end code $ED_1$ repeatedly to each of the terminals 2 during an n-number of cycles $CY_1$ to $CY_n$.

The central monitoring and control device 1 sends a binary bit string consisting of "0" and "1" as the address data $AD_1$ to the address comparator 7. The length of this bit string becomes consecutively longer as the cycle advances, for instance, from 1 bit when the cycle is $CY_1$ to n-bits when the cycle is $CY_n$. The address comparator 7 extracts data from the address set in the first address setter 5, so as to be provided with the same length as the bit length of the bit string sent from the central monitoring and control device 1, and compares the extracted data with the bit string sent from the central monitoring and control device 1.

For instance, during the cycle $CY_1$, the central monitoring and control device 1 sends a 1-bit string "0", and this bit string "0" is compared with the most significant bit of the address set in the first address setter 5 of each of the terminal devices 2. If there is any terminal device 2 having an address "0 ...", this terminal device 2 imparts an acknowledgment, response signal ACK to the central monitoring and control device 1, and the central monitoring and control device 1 receives that acknowledgment response signal ACK. Upon receiving the acknowledgment response signal ACK, the central monitoring and control device 1 sends a 2-bit string "00" to each of the terminal devices 2 in an ensuing cycle.

As a result, the address comparator 7 extracts data of a 2-bit portion starting with the most significant bit of the address set in the first address setter 5 of each of the terminal devices 2, and compares the extracted data with the aforementioned bit string "00". If there is any terminal device 2 having an address "00 ...", the acknowledgment response signal ACK is received by the central monitoring and control device, so that the central monitoring and control device 1 sends a 3-bit string "000" in an ensuing cycle. On the other hand, when, for instance, a 2-bit string "00" is sent, if there is no terminal 2 having an address "00 ...", none of the terminal devices 2 send the acknowledgment response signal ACK and the central monitoring and control device 1 does not receive that acknowledgment response signal ACK. In this case, therefore, a 3-bit string "010" in which the second bit is set to "1" is sent during an ensuing cycle. Thus, an n-bit string is sent during an n-th cycle $CY_n$, and this bit string can be made to coincide with any of the addresses set in the first address setters 5 of the respective terminal. devices 2. In consequence, the central monitoring and control device 1 is capable of identifying any terminal devices 2 having an address which coincides with a bit string having all the bits, i.e, n-bits.

It should be noted that, when an n-bit string "... 0" is set during a cycle $CY_n$, if there is any terminal device 2 having an address which coincides with this bit string "... 0" excepting that the least significant bit is "1", it is necessary to send an n-bit string "... 1" by providing another cycle after the cycle $CY_n$ in order to obtain complete coincidence with the address of this terminal device 2. In this case, an (n+1) number of cycles is required until this terminal device 2 is identified.

When any one of the terminal devices 2 is thus identified, the central monitoring and control device 1 sends a new address data RAD for new address-setting to that terminal device 2, and this terminal device 2 sets the new address data RAD as the new address in the second address setter 6, and subsequently sends an acknowledgment response signal $RT_1$ to the central monitoring and control device 1. Thus, a new address is set for one terminal device 2.

When a new address is set with respect to, one terminal device 2, the central monitoring and control device 1 repeats an n-number of cycles $CY_1$ to $CY_n$ or an (n+1) number of cycles. At that juncture, an arrangement is provided such that access to any terminal device 2 for which a new address has already been set is prohibited, so that a new address can be set in the second address setter 6 of the terminal device 2 for which a new address has not been set, in a procedure similar to the one described above.

In a system where an m-number of terminals 2 are present, it is possible to set new addresses with respect to all the m-number of terminal devices 2 by repeating an n-number or (n+1) number of cycles $CY_1$ to $CY_n$ an m-number of times, i.e., as the central monitoring and control device 1 effects polling an.{(n+1)×m}-number of times at most.

Accordingly, even in the case of a system having 256 terminal devices 2 each having a 20-bit address set in the first address setter 5, it is possible to search all the terminal devices 2 and set new addresses for them within a very short period of time of slightly less than two minutes.

If the values of the new addresses are sequentially incremented, by setting, for instance, "...00" to a firstly identified terminal device 2, "...01" to a secondly identified terminal device 2, "...10" to a thirdly identified terminal device 2, and so forth, it is possible to set the new addresses in such a manner as to be provided with a fewer number of bits in terms of the aggregate number of terminal devices 2 and in such a manner that identical addresses will not be assigned to different terminal devices 2.

If the setting of new addresses is completed with respect to all the terminal devices 2, the central monitoring and control device 1 is capable of monitoring and controlling a given apparatus 10 and/or information generator 11 by means of a polling on the basis of newly set addresses as shown in FIG. 2b. In other words, the central monitoring and control device 1 sends a start code $ST_2$, a given address data $AD_2$, and an end code $ED_2$ to each of the terminal devices 2.

In each of the terminal devices 2, the address comparator 7 compares the address data $AD_2$ sent from the central monitoring and control device 1 with the new address set in the second address setter 6. At the time of this comparison, if the number of terminal devices 2 is assumed to be, for instance, 16 to 1,024, the number of bits of the new address is small in the vicinity of 4 to 10 bits. Thus, it is possible to effect a comparison more speedily as compared with a case where a polling is effected on the basis of a redundant address having a large number of bits and set in the first address setter 5. The terminal device 2 for which the results of this comparison have coincided supplies information to that effect to the central monitoring and control device 1. As a result the central monitoring and control device 1 is capable of speedily identifying any terminal device 2 specified by the address data $AD_2$, so that it becomes possible to enhance the transmission efficiency remarkably.

If a given terminal device 2 is identified, the central monitoring and control device 1 sends a control data CN to that terminal device 2. Upon receiving this control data CN, the terminal device 2 accesses the apparatus 10 and/or information generator 11 corresponding to that terminal device 2, and sends back the acknowledgment response signal $RT_2$ to the central monitoring and control device 1. Thus, the monitoring and control by the central monitoring/control device 1 of the apparatuses 10 and/or the information generators 11 is carried out.

As described above, in accordance with this embodiment, the operator is capable of freely setting the date of manufacture, the manufacturing No., or the like as a peculiar address in each of the terminal devices 2 so as to facilitate the management of the manufacturing process, the inventory control, etc. At that time, since the probability of the addresses being duplicated among the plurality of terminal devices 2 can be lowered, the operator need not conduct the setting of addresses unduly carefully, thereby making it possible to substantially reduce the labor and time required for address-setting. In addition, before the central monitoring and control device 1 actually performs monitoring and control, new addresses are set for the respective terminal devices with an optimum small number of bits corresponding to the number of the terminal devices 2, and the central monitoring and control device 1 effects polling on the basis of the new addresses, each having an optimum number of bits. Hence, it is possible to substantially improve the transmission efficiency.

Figure 3B:
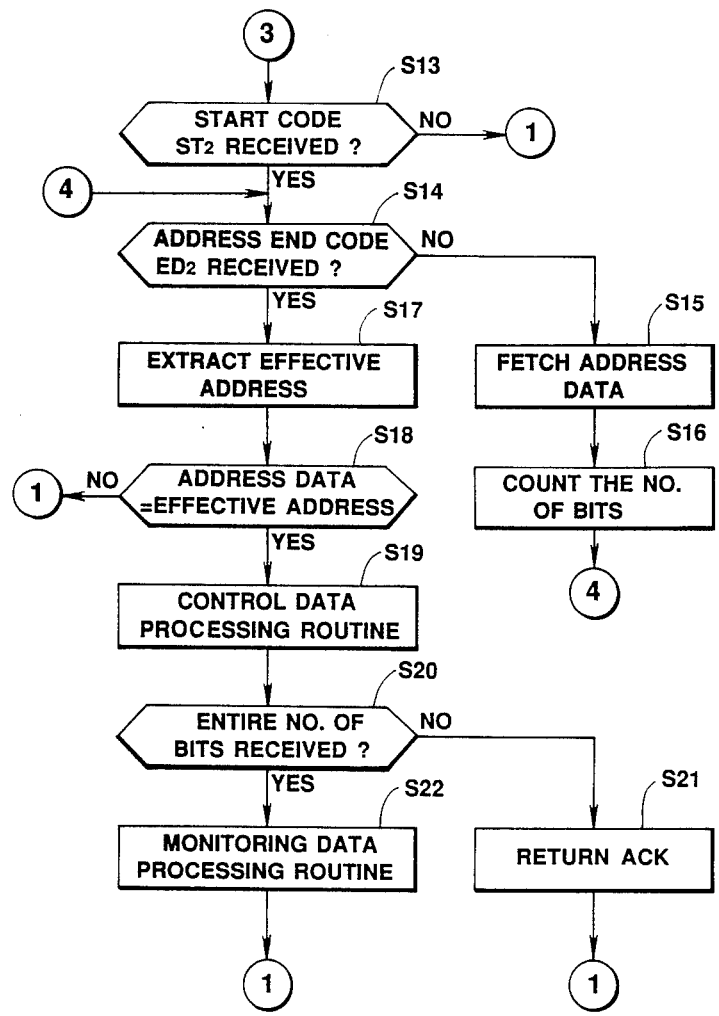

Referring now to the flowcharts shown in FIGS. 3a and 3b, a description will be given of a case where the above-described processing is performed by a microcomputer (not shown) which is used instead of some of the elements of the terminal device 2 shown in FIG. 1. In FIGS. 3a and 3b, Steps S2 to S12 indicate a new address-setting process. In addition, Steps S13 to S22 indicate a process for monitoring and controlling a given apparatus 10 and/or information generator 11 on the basis of the new address. In this process, however, processing differs from that described using FIG. 2b in that in a case where a plurality of terminal devices 2 are installed in groups, for instance, at a number of locations within a building, i.e., in a case where a number of terminal devices are installed in a certain location of a building and some others are installed at a different location of a building, consideration has been paid to the fact that these terminal devices installed in groups are polled in a group unit.

First, if the power of the terminal devices 2 is turned ON, an initialization routine is executed (Step S1). Then, a transmission signal sent from the central monitoring and control device 1 is received, and a determination is made as to whether or not it is the start code $ST_1$ (Step S2). If it is the start code $ST_1$, a determination is made as to whether or not a signal to be fetched next is the address end code $ED_1$ (Step S3). If NO is the answer, the signal is fetched as the address data $AD_1$, i.e., a bit string (Step S4), and the number of bits of the address data $AD_1$ is counted (Step S5). If the address end code $ED_1$ is detected in Step S3, data corresponding to that number of bits is extracted from the address set in the first address setter 5, starting with the most significant bit thereof, and is set as an effective address (Step S6). Then, a determination is made as to whether or not a new address has already been set in the second address setter 6 (Step S7). If a new address has not been set, a determination is made as to the coincidence of the effective address with the address data $AD_1$ (Step S8). If they coincide, a determination is made as to whether or not the number of bits of the address data $AD_1$ coincides with the entire number of the bits of the address preset in the first address setter 5 (Step S9). If NO is the answer, only the acknowledgment response signal ACK is returned (Step S12). If YES is the answer, the new address data RAD is sent from the central monitoring and control device 1 after the address end code, so that this new address data RAD is fetched and is set as the new address in the second address setter 6 (Steps S10, S11), and the acknowledgment response signal ACK is returned in due course of time (Step S12). As the processing of Steps S2 to S12 is repeated by the number of the terminal devices 2, it is possible to set new addresses with respect to all the terminal devices 2.

After all the new addresses have thus been set with respect to all the terminal devices 2, the central monitoring and control device 1 starts the monitoring and control of a given apparatus 10 and/or information generator 11. After the central monitoring and control device 1 sends the start code $ST_2$ and when it is detected (Step S13), a determination is made as to whether or not a signal to be fetched next is the address end code $ED_2$ (Step S14). If NO is the answer, the signal is fetched as an address data, i.e., a bit string (Step S15), and the number of bits of this address data is counted (Step S16).

If the address end code $ED_2$ is detected (Step S14), data corresponding to the number of bits counted in Step 16 is extracted from the new address set in the second address setter 6, starting with the most significant bit thereof, and is set as an effective address (Step S17). Subsequently, the address data is compared with the effective address (Step S18). If a new address has not been set, a determination of noncoincidence is made in Step S18. If the address data coincides with the effective address, the next control data sent from the central monitoring and control device 1 is fetched, and a control data processing routine is executed (Step S19). Then, a determination is made as to whether or not the number of bits of the effective address coincides with the entire number of bits of the new address (Step S20). If YES is the answer, since one particular terminal device 2 has been polled, that terminal device 2 executes a monitoring data processing routine and returns a monitoring information signal data to the central monitoring and control device 1 (Step S22). If NO is the answer in Step S20, it is determined that the case is a group polling, and merely the acknowledgment response signal is returned (Step S21).

Although, in the above-described example of processing, the number of bits of a new address set in the second address setter 6 is determined to be a predetermined number of bits, it is possible to further enhance the transmission speed if a new address having a fewer number of bits is allotted to a terminal device which is frequently polled, and a relatively large number of bits is allotted to a terminal device which is less frequently polled. As for such a new address setting, if the address end code is sent after transmission of the new address data RAD, and if the number of bits of the new address data RAD can be ascertained when the new address data RAD is fetched in Step S10, it is possible to fetch only a required number of bits as the new address.

It should be noted that although the first and second address setters 5, 6 are provided separately for the respective terminal devices 2, an arrangement may be alternatively provided such that these address setters 5, 6 are realized by an identical hardware device by using a memory such as a rewritable EPROM or the like.

What is claimed is:

1. A terminal device adapted to effect transmission and receipt of information through address polling from a central monitoring and control device, comprising:
   first address setting means in which an address having a predetermined number of bits is preset;
   comparing means for comparing address data sent from said central monitoring and control device with said address having the predetermined number of bits and set in said first address setting means;
   second address setting means in which, when said address data sent from said central monitoring and control device coincides with said address set in said first address setting means, a new address having a fewer number of bits than that of said address set in said first address setting means is sent from said central monitoring and control device and is set,
   wherein after the new address is set in said second address setting means, said central monitoring and control device effects polling on the basis of said new address.

2. A terminal device according to claim 1, wherein said address preset in said first address setting means has a number of bits necessary for sufficiently lowering the probability of being duplicated among a plurality of terminal devices.

3. A terminal device according to claim 1, wherein said comparing means is arranged such that data having the same length as the bit length of a bit string which are sent as address data from said central monitoring and control device with its bit length sequentially incremented for each address data is extracted from said address set in said first address setting means, said extracted data are compared with said bit string sent from said central monitoring and control device, this comparing processing is effected sequentially for each time said address data are sent from said central monitoring and control device, and the comparing processing is completed in a cycle in which the length of said bit string coincides with the length of the entire bits of said address set in said first address setting means, or in an ensuring cycle.

4. A terminal device according to claim 1, wherein said new address sent from said central monitoring and control device to be set in said second address setting means has a number of bits approximately corresponding to an aggregate number of terminal devices incorporated in the monitoring and control device.

5. A terminal device according to claim 1, wherein, with respect to said new address sent from said central monitoring and control device to be set in said second address setting means, a small number of bits is allotted to a terminal device which is frequently polled by said central monitoring and control device, while a relatively large number of bits is allotted to a terminal device which is less frequently polled thereby.

6. A terminal device according to claim 1, wherein, when polling is effected on the basis of said new address set in said second address setting means, said new address is compared and collated, in a single operation of comparison, with address data of the entire bits sent from said central monitoring and control device.

7. A terminal device according to claim 1, wherein, when polling is effected on the basis of said new address set in said second address setting means, said new address is sequentially compared and collated with a bit string which is sent as address data from said central monitoring and control device with its bit length sequentially incremented for each time said address data are sent from said central monitoring and control device.

* * * * *